United States Patent
Tohdo et al.

(10) Patent No.: US 7,512,469 B2
(45) Date of Patent: Mar. 31, 2009

(54) METHOD AND SYSTEM FOR CONTROLLING BEHAVIORS OF VEHICLE

(75) Inventors: Tetsuya Tohdo, Anjo (JP); Masayuki Kobayashi, Anjo (JP); Ryusuke Fukui, Kariya (JP)

(73) Assignee: DENSO Corporation, Kariya (JP)

( * ) Notice: Subject to any disclaimer, the term of this patent is extended or adjusted under 35 U.S.C. 154(b) by 686 days.

(21) Appl. No.: 11/035,026

(22) Filed: Jan. 14, 2005

(65) Prior Publication Data

US 2005/0159869 A1    Jul. 21, 2005

(30) Foreign Application Priority Data

Jan. 15, 2004    (JP)    ............................. 2004-008209

(51) Int. Cl.
    *B60R 22/00*    (2006.01)
(52) U.S. Cl. ........................................ 701/48; 701/102
(58) Field of Classification Search .................. 701/48, 701/102, 111, 35, 37, 54; 280/5.504, 5.513
See application file for complete search history.

(56) References Cited

U.S. PATENT DOCUMENTS

| | | | |
|---|---|---|---|
| 4,862,370 A * | 8/1989 | Arnold et al. | 701/113 |
| 5,369,581 A * | 11/1994 | Ohsuga et al. | 701/48 |
| 5,787,132 A | 7/1998 | Kishigami et al. | |
| 6,032,640 A * | 3/2000 | Evans | 123/295 |
| 6,356,813 B1 * | 3/2002 | Sommer et al. | 701/1 |
| 6,998,996 B1 | 2/2006 | Eidson | |

FOREIGN PATENT DOCUMENTS

| | | |
|---|---|---|
| JP | 8-98284 A | 4/1996 |
| JP | 11-206167 | 7/1999 |
| JP | 2000-173674 | 6/2000 |
| JP | 2000-200106 | 7/2000 |
| JP | 2000-209225 | 7/2000 |
| JP | 2002-157005 | 5/2002 |
| JP | 2003-049704 | 2/2003 |

OTHER PUBLICATIONS

Examination Report mailed Nov. 20, 2007 in JP Patent Application No. 2004-008209 with English translation.
Japanese Office Action mailed Aug. 28, 2007 in Application No. 2004-008209 together with an English translation.

* cited by examiner

*Primary Examiner*—Mark Hellner
(74) *Attorney, Agent, or Firm*—Nixon & Vanderhye P.C.

(57) ABSTRACT

A system for controlling behaviors of a vehicle is provided. The system comprises a first transmission device (for example, an ABS ECU), a second transmission device (for example, an engine ECU), and a reception/processing unit (i.e., a superior control unit). The first transmission device transmits a first time-dependent data to be used for controlling behaviors of the vehicle, while the second transmission device transmits a second time-dependent data to be used for controlling behaviors of the vehicle. The reception/processing unit receives both of the first and second time-dependent data and performs processing to ensure simultaneity between the first and second time-dependent data that have been received. The reception/processing unit also produces parameters for controlling the behaviors of the vehicle using both of the first and second time-dependent data which have been subjected to the simultaneity-ensuring processing.

18 Claims, 6 Drawing Sheets

METHOD AND SYSTEM FOR CONTROLLING BEHAVIORS OF VEHICLE

CROSS REFERENCES TO RELATED APPLICATIONS

The present application relates to and incorporates by reference Japanese Patent application No. 2004-8209 filed on Jan. 15, 2004.

BACKGROUND OF THE INVENTION

1. Technical Field of the Invention

The present invention relates to a method and system for controlling behaviors of a vehicle, especially a running vehicle, based on a plurality of sets of time-dependent data received from various sensors to detect information indicating vehicle behaviors.

2. Description of the Related Art

Various types of systems for controlling behaviors of a vehicle (i.e., various type vehicle control systems) have been known and a vehicle control system that uses a plurality of sets of time-dependent data constitutes one type of those vehicle control systems. For example, such a type of vehicle control system can be realized by a configuration which determines, as a total, information indicative of a crank angle, main throttle opening, and ABS (antilock brake system) ECU (electronic control unit) and then calculates parameters for controlling the brake and engine of the vehicle.

FIG. 1 exemplifies such a control system for vehicles, in which a block diagram of the vehicle control system is provided by a reference 200. This exemplified vehicle control system 200 comprise an engine ECU 220 which receives, from sensors connected to the engine ECU 220, inputs of an idle signal, a crank angle signal, an engine air-intake signal, a main throttle opening signal, a knock signal, an engine cooling water temperature signal, and a starter signal, and transmits some or all data of these received inputs to an integrated ECU 210 via an in-vehicle LAN 250.

In parallel with the data transmission carried out by the engine ECU 220, the ABS ECU 230 receives, from a sensor connected to the ABS ECU 230, an input of a wheel speed signal, and transmits the data of the received input to the integrated ECU 210 via the in-vehicle LAN 250.

Thus it can be said that these engine ECU 220 and ABS ECU 230 transmit time-dependent data, which change consistently depending on running conditions of the vehicle and conditions outside the vehicle.

The integrated ECU 210 receives those time-dependent data transmitted from both of the engine ECU 220 and the ABS ECU 230, and generally uses those received data to calculate parameters for controlling the engine and brake. The control parameters for the engine (i.e., engine control parameters) include an ignition timing of an ignition coil, an amount of fuel to be injected, and timing for fuel injection. The control parameters for the brake (i.e., brake control parameters) include timing for brake and an amount of brake to be operated.

The integrated ECU 210 also transmits the calculated engine and brake control parameters to both the engine ECU 220 and the ABS ECU 230, respectively. The engine ECU 220 uses the engine control parameters transmitted from the integrated ECU 210 as a basis to control actuators, such as an ignition coil, fuel pump, and injector, connected to the engine ECU 220. The ABS ECU 230 uses the brake control parameters transmitted from the integrated ECU 210 as a basis to control a brake actuator connected to the ABS ECU 230.

In the systems for controlling behaviors of vehicles based on a plurality of sets of received time-dependent data as illustrated above, it is desired that the plurality of sets of time-dependent data on which the processing for vehicle behavior control is based have simultaneity. Such a control based on time-dependent data that preferably has simultaneity is made reference as real-time control.

For example, in the above-mentioned example, if the integrated ECU 210 calculates the control parameters using time-dependent data, some of which are transmitted from the engine ECU 220 at time $t_1$ and others of which are transmitted at time $t_2$ that is 1 second after the time $t_1$, these time-dependent data do not exactly reflect the simultaneous conditions to a vehicle and environmental conditions outside the vehicle. If the integrated ECU 210 generally uses such time-dependent data transmitted at different times to calculate the control parameters, mismatching may occur where vehicle behaviors differ largely from that desired in its design.

In actual vehicle control systems that use the foregoing configuration, the in-vehicle LAN 250 may delay the transmission and reception of data due to various reasons (e.g., reasons due to characteristics of communication protocols such as CAN (controller are network) and LIN (local interconnect network)). Thus, even if the integrated ECU 210 uses a plurality of sets of time-dependent data received at mutually-near times to calculate the control parameters and some of the data is delayed in the in-vehicle LAN 250, the mismatching in the vehicle control may really be caused as described above.

Accordingly, in the vehicle control systems, the processing for vehicle behavior control needs to use as a basis a plurality of sets of time-dependent data that reflect the simultaneous conditions in a vehicle and environmental conditions of a vehicle. When such a reflection is met, it is said that the plurality of sets of time-dependent data has simultaneity.

SUMMARY OF THE INVENTION

In light of the above-mentioned circumstances, an object of the present invention is to provide a method and system for controlling behaviors of a vehicle on the basis of a plurality of sets of time-dependent data to be received, in which the simultaneity is ensured between the plurality of sets of time-dependent data on which the relevant processing for vehicle behavior control is based.

To achieve the foregoing object, as one aspect, the present invention provides a system for controlling behaviors of a vehicle, comprising: a first transmission device transmitting a first time-dependent data to be used for controlling behaviors of the vehicle; a second transmission device transmitting a second time-dependent data to be used for controlling behaviors of the vehicle; and a reception/processing unit comprising a reception device receiving both of the first time-dependent data transmitted from said first transmission device and the second time-dependent data transmitted from said second transmission device, a first processing device performing processing to ensure simultaneity between the received first time-dependent data and the received second time-dependent data, and a second processing device producing parameters for controlling the behaviors of the vehicle using both of the first time-dependent data and the second time-dependent data which have been subjected to the simultaneity-ensuring processing performed by the first processing device.

Accordingly, in the system for controlling behaviors of a vehicle based on a plurality of sets of received time-dependent data, the reception/processing unit has the first processing device that performs the processing to ensure simultaneity between the received first time-dependent data and second time-dependent data. The simultaneity can therefore be ensured between the plural sets of time-dependent data on which the relevant processing for vehicle behavior control is based.

In the present invention, the data and processing "for vehicle behavior control" refers to a concept that includes not only data and processing for control of vehicle behavior itself but also data and processing necessary for preprocessing for vehicle behavior control.

Preferably, the first transmission device is configured to attach, to the first time-dependent data to be transmitted, data showing a first reference time at or before which the first time-dependent data is transmitted, the second transmission device is configured to attach, to the second time-dependent data to be transmitted, data showing a second reference time at or before which the second time-dependent data is transmitted, and the first processing device includes a comparison member making a comparison between the first and second reference times shown by the data attached to the first and second time-dependent data and a processing-performing member performing the processing to ensure the simultaneity between the first time-dependent data and the second time-dependent data in response to a particular compared result coming from the comparison member.

In the foregoing, each of the first and reference times is defined as "a time instant at or before which the first (second) time-dependent data is transmitted by the first (second) transmission device" and which can be used for determining simultaneity between or among two or more sets of time-dependent data.

Therefore, by way of example, the first reference time is a time instant at which the first transmission unit transmits the first time-dependent data and the second reference time is a time instant at which the second transmission unit transmits the second time-dependent data.

Furthermore, it is preferred that the comparison member includes determining means determining whether or not a difference between the first and second reference times is less than a predetermined period of time and allowing means allowing the processing-performing member to perform the processing to ensure the simultaneity, when it is determined that the difference is less than the predetermined period of time.

It is still preferred that each of the first and second transmission devices is configured to repeatedly transmit the first and second time-dependent data, respectively. Data showing a first reference time defined at or before which the first time-dependent data is transmitted is attached to each of the first and second time-dependent data. In this configuration, the first processing device receives both of the first and second time-dependent data, makes a comparison between the first and second reference times shown by the data attached to the first and second time-dependent data currently received, determines whether or not a difference between the first and second reference times is less than a predetermined interval of time, and performs processing which compensates a result obtained when it is determined that the difference is equal to or longer than the predetermined interval of time.

Preferably, the compensation is carried out by replacing, every type of data, either the first or second time-dependent data with an old first or second time-dependent data received last time, determining whether or not a difference between a reference time attached to replaced time-dependent data of the first and second time-dependent data, which is subjected to the replacement, and a reference time attached to non-replaced time-dependent data of the first and second time-dependent data, which is not subjected to the replacement is less than a predetermined interval of time, and allowing the processing-performing member to perform the processing to ensure the simultaneity using the replaced time-dependent data and the non-replaced time-dependent data, in cases where the determining means determines that the difference is less than the predetermined interval of time.

DETAILED DESCRIPTION OF THE PREFERRED EMBODIMENTS

With reference to FIGS. 2-6, one embodiment of the present invention will now be described.

Figure 1:
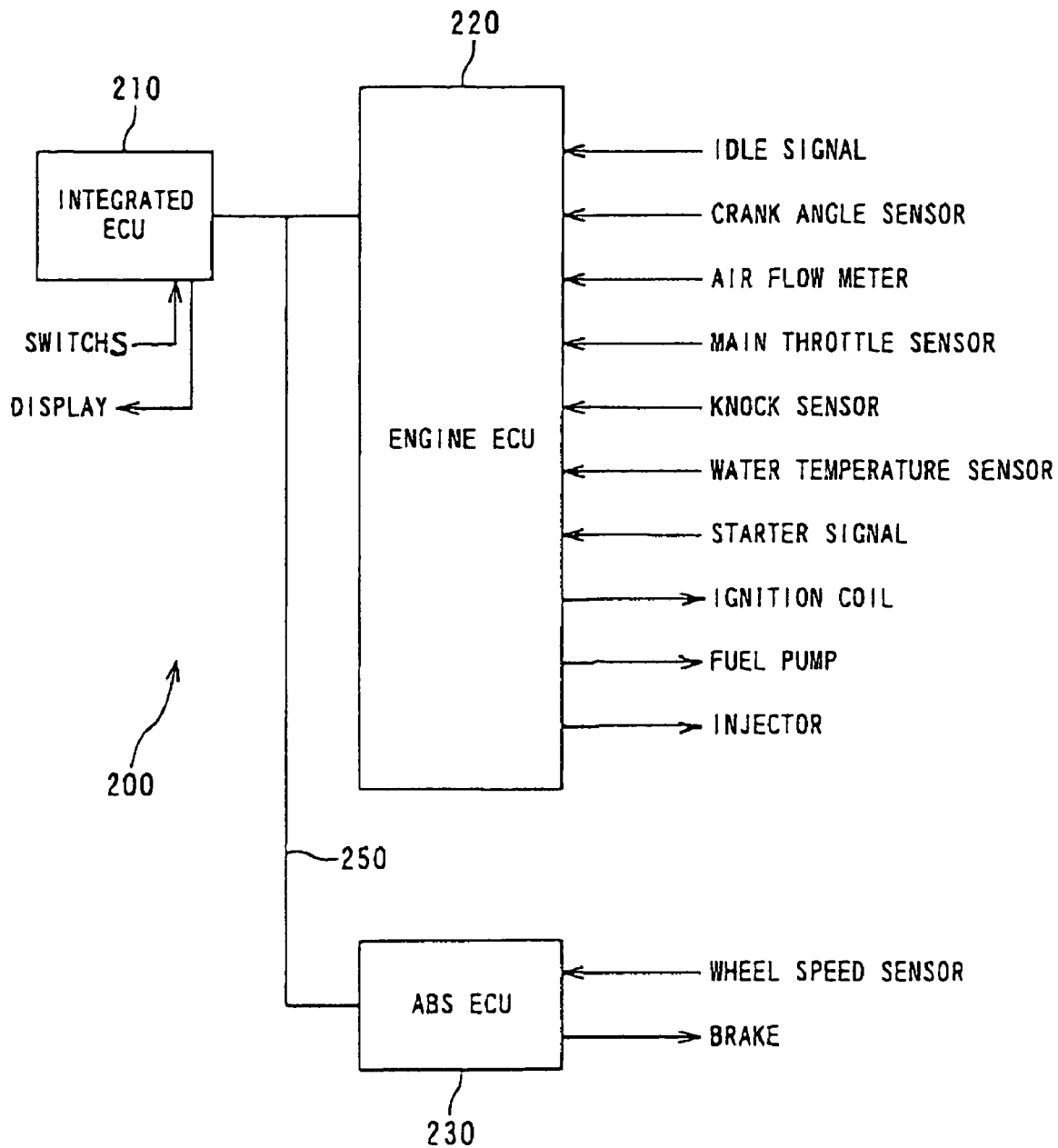
FIG. 1 shows the entire configuration of a conventional vehicle control system.
Figure 2:
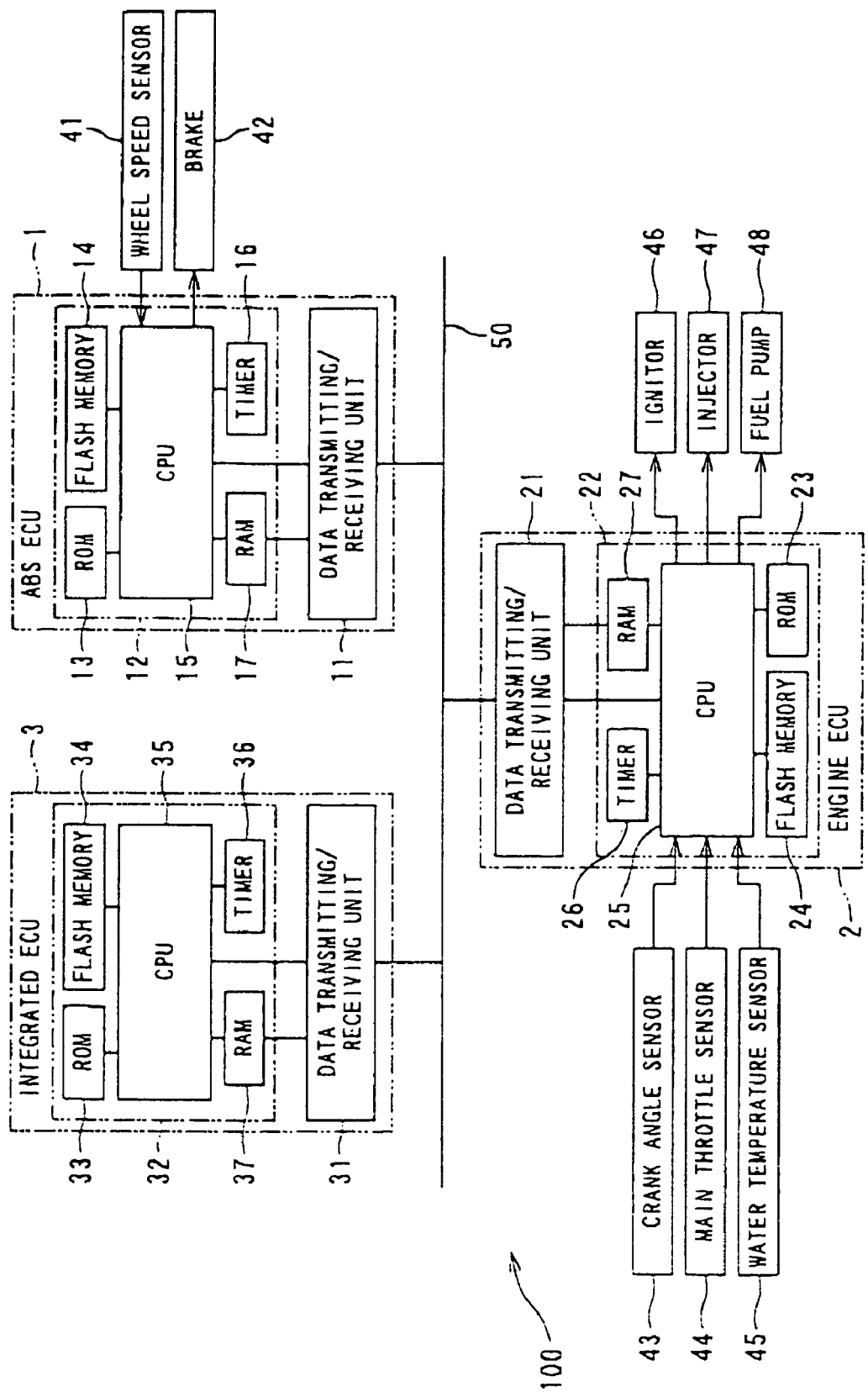
FIG. 2 shows the entire configuration of a system for controlling behaviors of a vehicle (i.e., vehicle control system) according to an embodiment of the present invention.

FIG. 2 shows the entire configuration of a system 100 for controlling behaviors of a vehicle (vehicle control system) according to the instant embodiment. The vehicle control system 100 is provided with an ABS ECU 1, engine ECU 2, and integrated ECU 3, all of which are connected to an in-vehicle LAN 50 placed in the vehicle.

In this embodiment, the ABS ECU 1 transmits time-dependent data indicative of wheel speed to the integrated ECU 3, and engine ECU 2 transmits engine related time-dependent data such as data indicative of crank angle, main throttle opening, and engine cooling water temperature to the integrated ECU 3. The integrated ECU 3 receives these time-dependent data and generally uses the received time-dependent data to calculate both of brake control parameters (i.e., parameters used to control braking devises of the vehicle) and engine control parameters (i.e., parameters used to control the engine of the vehicle). Then, the integrated ECU 3 not only transmits the calculated brake control parameters to the ABS ECU 1 but also transmits the calculated engine control parameters to the engine ECU 2. Both the ABS ECU 1 and the engine ECU 2 receive these transmitted control parameters and use them as a basis to control in real time the vehicle-mounted brake and engine.

The time-dependent data refers here to data that can change in time depending on the running conditions of the vehicle and various conditions outside the vehicle.

The ABS ECU 1 is provided with a data transmitting/receiving unit 11 and a microcomputer 12.

The data transmitting/receiving unit 11 receives data from the microcomputer 12 and sends the data to the in-vehicle LAN 50 at an instant time defined predetermined transmission timing. The data transmitting/receiving unit 11 also receives data for the ABS ECU 1 flowing in the in-vehicle LAN 50, and stores the data in a predetermined memory area in a RAM 17 incorporated in the microcomputer 12.

The microcomputer 12 includes, as essential parts thereof, a ROM (Read Only Memory) 13, flash memory 14, CPU (Central Processing Unit) 15, timer 16, and RAM (Randomly Access Memory) 17.

The CPU 15 reads out and runs programs stored in read from the ROM 13 or flash memory 14, and operates based on the processing described in the programs, and in the operation, properly reads out information from the ROM 13, flash memory 14, and RAM 17, and writes information in the flash memory 14 and RAM 17. In the operation, the CPU 15 transmits data to the other ECUs connected to the in-vehicle LAN 50 by outputting to the transmitting/receiving unit 11 the data and identification data for the ECU to which the data is to be transmitted.

In the operation, the CPU 15 also receives a wheel speed signal from a wheel speed sensor 41 and also controls braking timing, an amount of brake to be operated, and the like of a brake 42, if required.

The engine ECU 2 is also provided with a data transmitting/receiving unit 21 and a microcomputer 22.

To be specific, the engine ECU 2 has an internal configuration that is similar to that of the foregoing ABS ECU 1. That is, in the ABS ECU 1, the data transmitting/receiving unit 11 is replaced with the data transmitting/receiving unit 21, the microcomputer 12 with the microcomputer 22, the ROM 13 with a ROM 23, the flash memory 14 with a flash memory 24, the CPU 15 with a CPU 25, the timer 16 with a timer 26, and the RAM 17 with a RAM 27, so that the engine ECU 2 is provided with the elements 21 to 27.

The CPU 25, however, does not directly transmit or receive, in its operation, any signal from the wheel speed sensor 41 or brake 42. The CPU 25 receives an engine crank angle signal from a crank angle sensor 43, a main throttle opening signal from a main throttle sensor 44, and a water temperature signal of the engine cooling water from a water temperature sensor 45, if required. The CPU 25 also controls the engine ignition timing for an ignitor 46, fuel injection timing for an injector 47, and an amount of fuel to be injected (i.e., fuel injection amount) for a fuel pump 48, if required.

The integrated ECU 3 includes, as main units thereof, a data transmitting/receiving unit 31 and a microcomputer 32.

Specifically, the integrated ECU 3 has an internal configuration that equals the above-described ABS ECU 1, so that the ABS ECU 1 should be replaced with the integrated ECU 3, the data transmitting/receiving unit 11 with a data transmitting/receiving unit 31, the microcomputer 12 with a microcomputer 32, the ROM 13 with a ROM 33, the flash memory 14 with a flash memory 34, the CPU 15 with a CPU 35, the timer 16 with a timer 36, and the RAM 17 with a RAM 37.

The CPU 35, however, does not directly transmit or receive, in its operation, any signal from the wheel speed sensor 41 or brake 42.

The data transmitting receiving unit 31 does not overwrite/save but append/save the time-dependent data received from the ABS ECU 1 and engine ECU 2 in a predetermined area in the RAM 37. Specifically, the data transmitting/receiving unit 31 will not erase the previously-received time-dependent memory data in the RAM 37, if any, and store the newly-received time-dependent data in the next area in the RAM 37.

The operations of the vehicle control system 100 having the above-described hardware configuration will now be described below.

The operations of the ABS ECU 1 will first be described. After starting up, the CPU 15 in the ABS ECU 1 runs the predetermined program stored and read in and from the ROM 13 as described above. In running the program, the CPU 15 periodically receives a wheel speed signal from the wheel speed sensor 41, and uses this wheel speed signal as a basis to determine the current wheel rotation angular speed. The CPU 15 also adds to a determined rotation angular speed the data of the current time based on a signal from timer 16 and data for assigning the integrated ECU 3 to the transmission destination. The CPU 15 then outputs the resultant data to the data transmitting/receiving unit 11. The data transmitting/receiving unit 11 thus sends to the in-vehicle LAN 50 time-dependent data that includes the wheel speed data, data of the time at which the wheel speed is determined, and data for assigning the integrated ECU 3 to the transmission destination. The transmission timing of the data transmitting/receiving unit 11 and operation timing of the CPU IS are previously designed such that the time at which the wheel speed is determined can be considered to equal the time at which the wheel speed data is sent from the data transmitting/receiving unit 11.

In the operation, the CPU 15 reads out the brake control parameters data that are received by the data transmitting/receiving unit 11 from the integrated ECU 3 and stored in a predetermined memory area in the RAM 17. The CPU 15 then uses the readout parameters as a basis to output the brake amount and braking timing control signals to the brake 42.

The operations of the engine ECU 2 will now be described. After starting up, the CPU 25 in the engine ECU 2 runs the predetermined program read from ROM 23 as described above. In running the program, the CPU 15 periodically receives a crank signal from the crank angle sensor 43, a main throttle opening signal from the main throttle sensor 44, an engine cooling water temperature signal from the water temperature sensor 45, and then uses these received signals as a basis to determine the engine related conditions data such as the current crank angle, main throttle opening, and engine cooling water temperature.

The CPU 25 also adds to the determined engine related conditions data the data of the current time based on a signal from a timer 26 and the data for assigning the integrated ECU 3 to the transmission destination, and then outputs the resultant data to the data transmitting/receiving unit 21. The data transmitting/receiving unit 21 thus sends to the in-vehicle LAN 50 time-dependent data that includes the engine related conditions data, data of the time at which the engine related conditions data are determined, and data for assigning the integrated ECU 3 to the transmission destination. The transmission timing of the data transmitting/receiving unit 21 and operation timing of the CPU 25 are previously designed such that the time at which the engine related conditions data are determined can be considered to equal the time at which the engine related conditions data are sent from the data transmitting/receiving unit 11.

In the operation, the CPU 25 reads out the engine control parameters data that are received by the data transmitting/receiving unit 21 from the integrated ECU 3 and stored in a predetermined memory area in the RAM 27. The CPU 25 then uses the read-out parameters as a basis to output the engine ignition timing control signal to the ignitor 46, the fuel injection timing control signal to the injector 47, and the fuel injection amount control signal to the fuel pump 48.

The operation of the integrated ECU 3 will now be described. The integrated ECU 3 receives the time-dependent data that is sent by both the ABS ECU 1 and the engine ECU 2 to the integrated ECU 3, and then uses these received time-dependent data to perform processing for vehicle behavior control.

Figure 3:
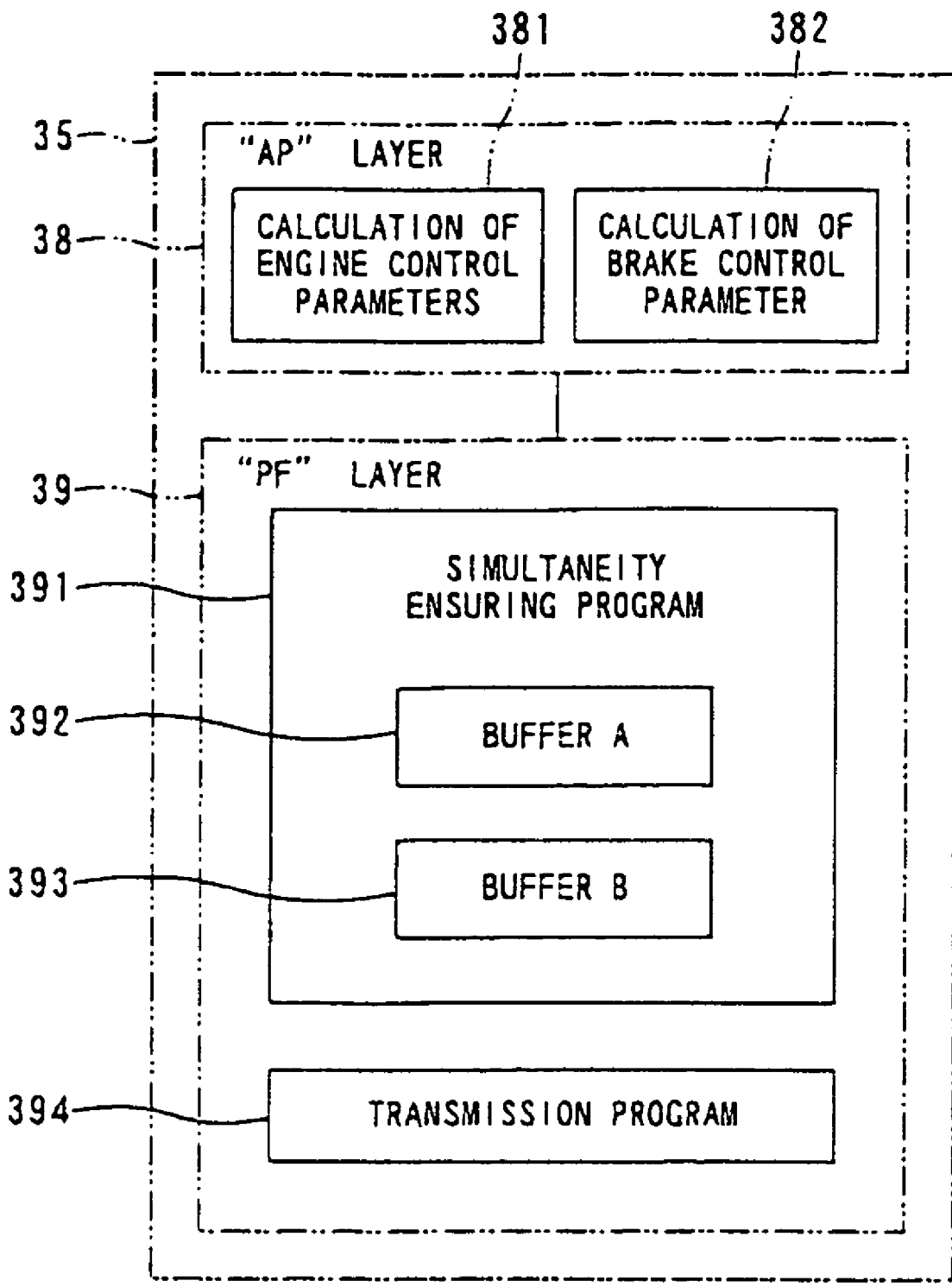
FIG. 3 shows a software diagram of the configuration of a program performed by a CPU employed by the vehicle control system.

FIG. 3 shows the configuration of a program (software) run by the CPU 35. The CPU 35 runs a program that is stratified into an application layer 38 and a platform layer 39. The platform layer 39 includes programs that describe a process for vehicle control depending on the hardware configuration of the integrated ECU 3. The application layer 38 includes programs that use the process results from the programs in the platform layer 39 to perform a process for vehicle control not depending on the hardware configuration of the integrated ECU 3.

Programs belonging to the application layer 38 include an engine control parameter calculation program 381 and a brake control parameter calculation program 382. Programs belonging to the platform layer 39 include simultaneity ensuring a program 391 and a transmission program 394.

The simultaneity ensuring program 391 compares the time data (corresponding to the reference time before transmission) included in the time-dependent data that are sent by the ABS ECU 1 and engine ECU 2 to the integrated ECU 3. If the time difference between these time data is equal to or less than a predetermined amount, the program 391 will permit the engine control parameter calculation program 381 and brake control parameter calculation program 382 to use the time-dependent data to perform a process for vehicle behavior control. For this operation, the simultaneity ensuring program 391 retains predetermined memory areas in the RAM 37 as a buffer(A) 392 and a buffer(B) 393. The buffer(A) 392 is an area in the RAM 37 where the data transmitting/receiving unit 31 stores the time-dependent data transmitted from the ABS ECU 1 to the integrated ECU 3. The buffer(B) 393 is another area in the RAM 37 where the data transmitting/receiving unit 31 stores the time-dependent data transmitted from the engine ECU 2 to the integrated ECU 3. As described above, the data transmitting/receiving unit 31 appends and stores the received time-dependent data in the RAM 37. The buffer(A) 392 and buffer(B) 393 thus store time-dependent data from the ABS ECU 1 and engine ECU 2, respectively, at the start address in the buffer(A) 392 and buffer(B) 393 in the same order as the data transmitting/receiving unit 31 receives the data. Every time the latest time-dependent data is stored at the start address in the buffer(A) 392 or buffer(B) 393, all of the previous time-dependent data shift by a predetermined address (address area necessary for the latest time-dependent data) until the stored data amount in the buffer(A) 392 or buffer(B) 393 reaches the buffer's maximum storage capacity. When the time-dependent data is stored in the buffer(A) 392 or buffer(B) 393 to the buffer's maximum storage capacity, the oldest time-dependent data is deleted.

The engine control parameter calculation program 381 periodically (at processing intervals depending on a load) calculates values of the described-above engine control parameters based on those data of time-dependent data received by the integrated ECU 3 from both the ABS ECU 1 and engine ECU 2 that are permitted by the simultaneity ensuring program 391 for use. The process of the simultaneity ensuring program 391 is stored in a predetermined memory area in the RAM 37 the data permitted for use, as described below. Calculated engine control parameters are stored in another predetermined memory area in the RAM 37 and sent to the transmission program 394.

The brake control parameter calculation program 382 periodically (at processing intervals depending on a load) calculates value of the described-above brake control parameters based on those data of time-dependent data received by the integrated ECU 3 from both the ABS ECU 1 and the engine ECU 2 that are permitted by simultaneity the ensuring program 391 for use. The process of the simultaneity ensuring program 391 is stored in a predetermined memory area in the RAM 37 the data permitted for use, as described below. Calculated brake control parameters are stored in another predetermined memory area in the RAM 17 and sent to the transmission program 394.

The transmission program 394 periodically reads out the brake control parameters and engine control parameters that are stored in the predetermined memory area in the RAM 17. The program 394 then adds to the brake control parameters the data for assigning the ABS ECU 1 to the transmission destination, and adds to the engine control parameters the data for assigning the engine ECU 2 to the transmission destination. The program 394 then outputs each resultant data to data the transmitting/receiving unit 31.

In such a layered configuration of the programs run by the CPU 35, the first layer program uses results from the simultaneity ensuring means, so that the design of programs belonging to the application layer 38, including engine control parameter calculation program 381 and brake control parameter calculation program 382, does not need to consider the simultaneity between the two sets of time-dependent data. That is, for each of the programs belonging to the application layer 38, there is no necessity of having processing for examining whether or not there exists simultaneity between the two sets of time-dependent data coming from the ECUs 1 and 2. As a result, both of the engine control parameter calculation program 381 and the brake control parameter calculation program 382 can run with a smaller number of program steps.

Figure 4:
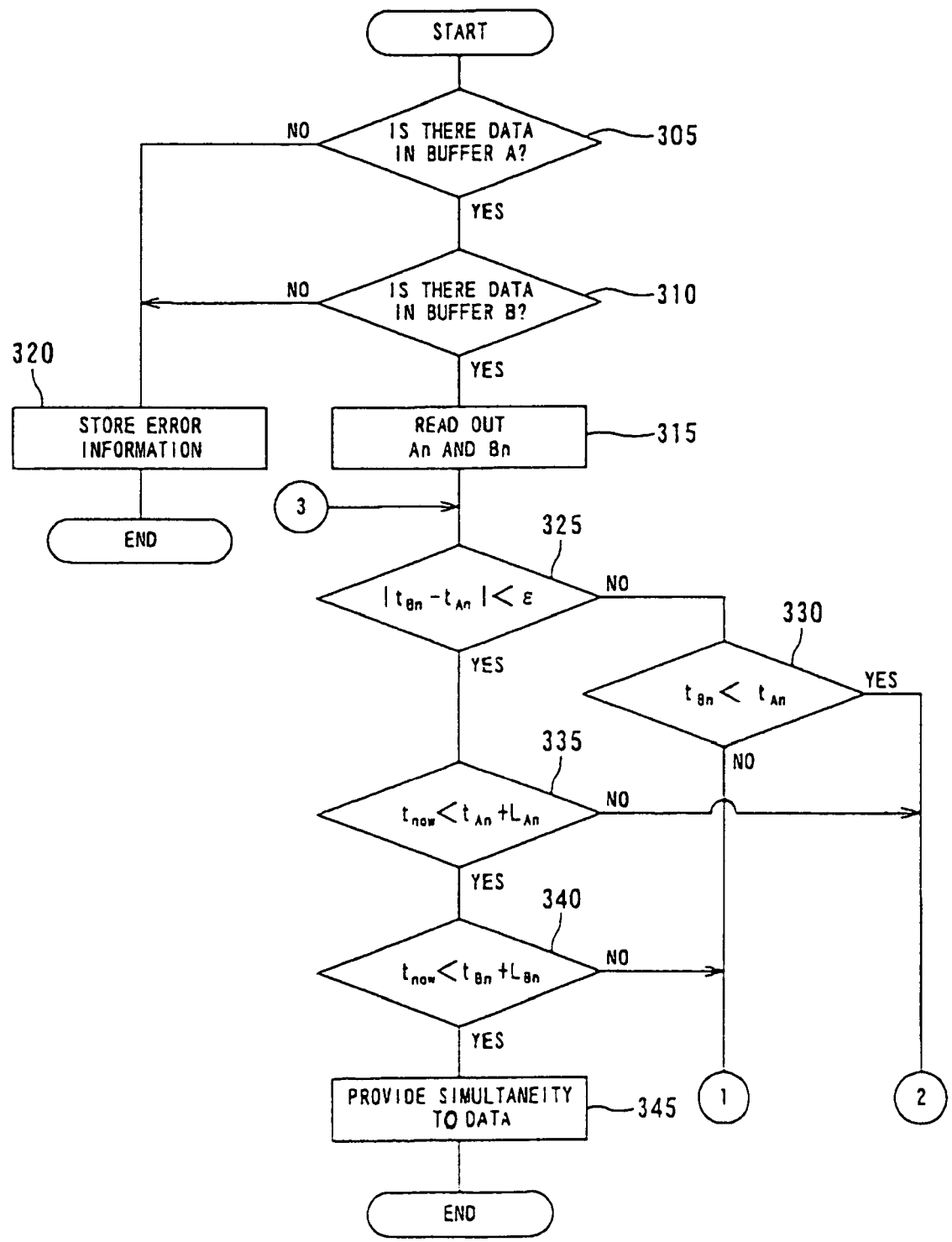
FIG. 4 shows a flowchart of a simultaneity ensuring a program performed by the CPU.
Figure 5:
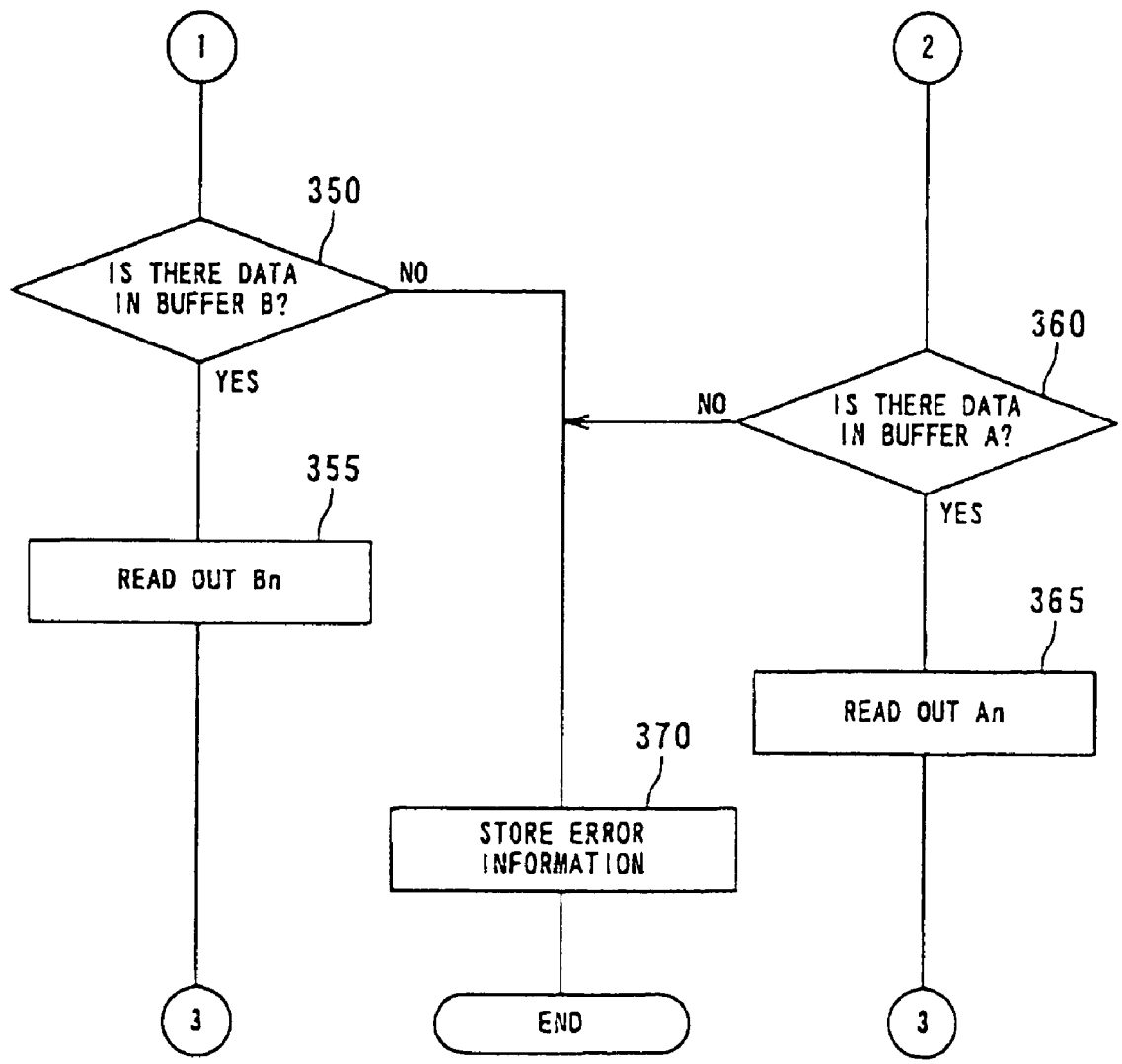
FIG. 5 shows another flowchart of a simultaneity ensuring program performed by the CPU.

The operations of the CPU 35 for running the simultaneity ensuring program 391 will now be described in detail. FIGS. 3 and 4 show a flowchart of the simultaneity ensuring program 391.

The CPU 35 runs the simultaneity ensuring program 391 periodically (at processing intervals depending on a load to be calculated).

At step 305, it is determined whether or not the buffer(A) 392 has data. If the buffer(A) 392 has data, the processing goes to step 310; if not, the processing is mad to go to step 320.

At step 310, it is determined whether or not the buffer(B) 393 has data. If the buffer B 393 has data, the processing is made to go to step 315; but, if not, the processing goes to step 320.

At step 315, one start data in each of the buffer(A) 392 and the buffer(B) 393 is read out and stored in a predetermined working area in the RAM 37. The start data refers to the latest data stored in the relevant buffer. Hereinafter, the data read out from the buffer(A) 392 is noted as An and the data read out from the buffer(B) 393 is noted as Bn.

At step 320, information showing an error occurrence is stored in the flash memory 34, and the processing of the simultaneity ensuring program 391 is abnormally terminated.

In these processes at steps 305-320, if both of the buffer(A) 392 and buffer(B) 393 have data, these data will be read out as data An and data Bn, respectively, and if at least one of the buffer(A) 392 and buffer(B) 393 has no data, error information is recorded and the program 391 is abnormally terminated.

Next to step 315, the processing proceeds to step 325, where the time data $t_{An}$ added to An and time data $t_{Bn}$ added to Bn are compared to determine whether or not the absolute value of the difference $|t_{An}-t_{Bn}|$ is less than a predetermined amount $\epsilon$. The value of the predetermined amount $\epsilon$ is previously stored in the ROM 33 or flash memory 34. In contrast, if $|t_{An}-t_{Bn}|$ is less than the predetermined amount $\epsilon$, the processing is made to go to step 335, while, if not, the processing is shifted to step 330.

At step 335, it is determined whether or not the current time $t_{now}$ measured by the timer 36 is before an expiration time having the $t_{An}$ plus a predetermined valid period of time $L_{An}$. The value of the valid period of time $L_{An}$ is previously stored in the ROM 33 or flash memory 34. If the current time $t_{now}$ is before the relevant expiration time, i.e., the data An has not expired, the processing transfers to step 340. If the current time $t_{now}$ is not before the relevant expiration time, i.e., the data An has expired, the processing is made to go to step 360 in FIG. 5.

At step 340, it is determined whether or not the current time $t_{now}$ is before an expiration time having the time $t_{Bn}$ plus a predetermined valid period of time $L_{Bn}$. The value of the valid period of time $L_{Bn}$ is previously stored in the ROM 33 or flash memory 34 in a different area from that of the value of the valid period $L_{An}$. If the current time $t_{now}$ is before the relevant expiration time, i.e., the data Bn has not expired, the processing is shifted to step 345. In contrast, if the current time $t_{now}$ is not before the relevant expiration time, i.e., the data Bn has expired, the processing is made to advance to step 350 in FIG. 5.

At step 345, the simultaneity is provided to both the data of An and the data of Bn. Specifically, the data of An and data of Bn are stored in a predetermined memory area in the RAM 37. This predetermined area is a use-permitted area that stores the data An and Bn, which are used by the above-described engine control parameter calculation program 381 and brake control parameter calculation, program 382 for each process for vehicle behavior control. After step 345, the process ends.

In the processing at steps 325, 335, 340, and 345, only if the time data provided to data of An and data of Bn (i.e., the time at which the relevant data is calculated) is within the predetermined time difference E and both the data of An and data of Bn have not expired, the simultaneity is provided to the data of An and data of Bn, and the use of this data is permitted to the engine control parameter calculation program 381 and brake control parameter calculation program 382.

If the amount $|t_{An}-t_{Bn}|$ is equal to or more than a predetermined amount $\epsilon$, the processing is made to go to step 330, where it is determined whether or not the time $t_{An}$ is later (i.e., closer to the current time $t_{now}$) than the time $t_{Bn}$. In cases where the determination is affirmative, that is, when the time $t_{An}$ is later than the time $t_{Bn}$, the processing is shifted to step 360 in FIG. 5. However, if the time $t_{An}$ is consistent with or before the time $t_{Bn}$, the processing goes to step 350 in FIG. 5.

At step 350, it is determined whether or not the buffer(B) 393 has data, in the similar manner to step 310 in FIG. 4. When this determination reveals that the buffer(B) 393 has data, the processing is made to go to step 355; if not, however, the processing is forced to go to step 370.

At step 355, one start data in the buffer(B) 393 is read out and stored in an area assigned to a variable Bn in the RAM 37. The processing then returns to step 325 in FIG. 4.

At step 360, it is determined whether or not the buffer(A) 392 has data, similarly to step 305 in FIG. 4. If the buffer(A) 392 has data, the processing is made to go to step 365. In contrast, if not, the processing is made to proceed to step 370.

At step 365, one start data in buffer A 392 is read out and stored in an area of variable An in RAM 37. The processing then returns to step 325 in FIG. 4.

At step 370, information showing an error occurrence is stored in the flash memory 34, and the processing of the simultaneity ensuring program 391 is terminated due to the occurrence of abnormality.

Through the processing at steps 330, 350, 355, 360, 365, and 370, if the time data provided to the first read-out data from the buffer(A) 392 or buffer(B) 393 is equal to or more than a predetermined time difference $\epsilon$ (see step 325), use of the data is not permitted to the engine control parameter calculation program 381 and brake control parameter calculation program 382, and one of the data An and data Bn that has the time ($t_{An}$ or $t_{Bn}$) later than the other ($t_{Bn}$ or $t_{An}$) (see step 330) is replaced with newly readout data from (i.e., data stored at the preceding address in) the relevant buffer(A) 392 or buffer(B) 393 (see steps 355 and 365), and the data replaced is then compared with the data non-replaced on the simultaneity, expiration time, and the like (steps 325, 335, 340).

If when the data of An or Bn is replaced, no data resides at the address preceded by one (the one-preceding address) in the relevant buffer(A) 392 or buffer(B) 393 (steps 350 and 360), information indicative of an error is stored and the processing is abnormally terminated (step 370).

Even when the time data provided to the first read-out data from the buffer(A) 392 or buffer(B) 393 is less than a predetermined time difference $\epsilon$, but if either of the An and Bn data has expired (see steps 335 and 340), the expired data is replaced with the data stored at the one-preceding address in buffer(A) 392 or buffer(B) 393, similarly to the foregoing, and the data replaced is then compared with the data non-replaced on the simultaneity, expiration time, and the like.

In this way, if the data An or Bn to be compared with each other is determined to have no simultaneity or have expired or the like, it will be repeated that the data is replaced with the data stored at the one-preceding address in the relevant buffer and the data replaced is compared with the data non-replaced, as long as the relevant buffer has data at the one-preceding address. If the buffer(A) 392 or buffer(B) 393 is determined to have no data for replacement, information showing an error is stored in the flash memory 34, before the processing ends.

The error information stored in the flash memory 34 through the above-described processing may be stored along with the number of times of storing the error information. This information can be used later in a test with diagnostic tools. The CPU 35 periodically runs a predetermined program to read out the information on the above-described number of times. If the number of times is equal to or more than a predetermined number of times, stored in the flash memory 34 is information indicating an occurrence of abnormality, such as failure of the ABS ECU 1, engine ECU 2, or integrated ECU 3. Also, if the number of times is equal to or more than the predetermined number of times, a learning function which, for example, increases the predetermined amount $\epsilon$ may be performed.

Figure 6:
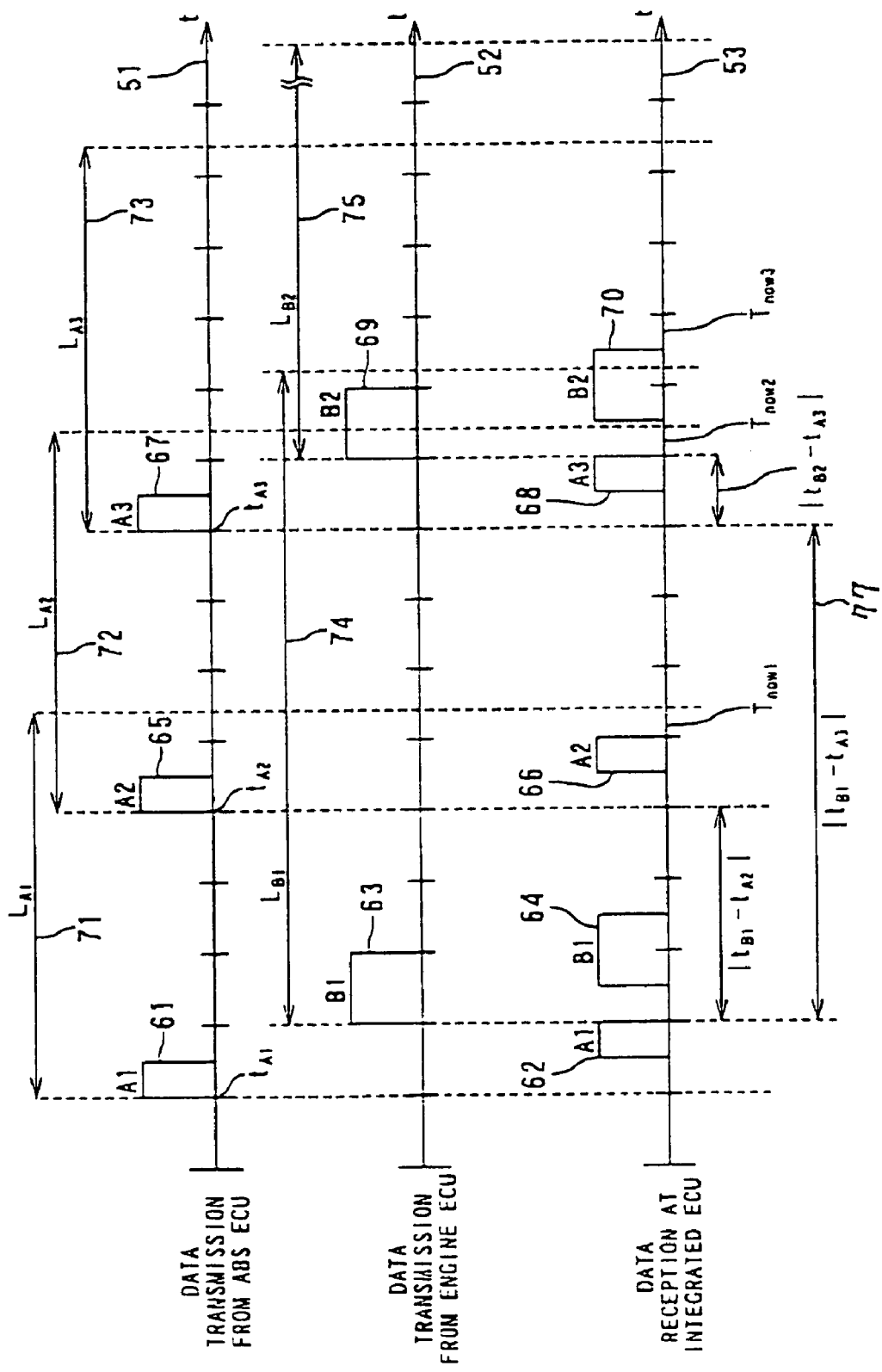
FIG. 6 shows a timing chart of an example of transmission and reception of time-dependent data between an ABS ECU, engine ECU, and integrated ECU mounted on the vehicle.

FIG. 6 illustrates an example of the operation timing of the ABS ECU 1, engine ECU 2, and integrated ECU 3 when the CPU 35 runs the simultaneity ensuring program 391 as mentioned above. This figure is a timing chart showing events-occurrence time period indicated by rectangles 61 to 70 or the like in the time flow in the direction of arrows on the horizontal axes 51, 52, and 53. Described on the horizontal axis 51 is the timing of time-dependent data transmission events 61, 65, and 67 in the ABS ECU 1. Described on the horizontal axis 52 is the timing of time-dependent data transmission events 63 and 69 in the engine ECU 2. Described on the horizontal axis 53 is the timing of time-dependent data receiving events 62, 64, 66, 68, 70, and the like in the integrated ECU 3.

In this example, the described-above valid periods $L_{An}$ and $L_{Bn}$ are different for each data that is read out from the buffer (A) 392 and buffer(B) 393. The valid period value for each data may be added to the time-dependent data transmitted from the ABS ECU 1 and engine ECU 2.

In this figure, at the beginning, the ABS ECU 1 transmits time-dependent data A1 with the starting point being time $t_{41}$ and the duration being the width of a rectangle 61. The data transmitting/receiving unit 31 of the integrated ECU 3 then receives this data A1 in the time period indicated by the position and width of a rectangle 62, and stores data A1 in the buffer(A) 392.

The engine ECU 2 then transmits time-dependent data B1 with the starting point being time $t_{B1}$ and the duration being the width of a rectangle 63. The data transmitting/receiving unit 31 of the integrated ECU 3 then receives this data B 1 in the time period indicated by the position and width of a rectangle 64, and stores data B1 in the buffer(B) 393.

The ABS ECU 1 then transmits time-dependent data A2 with the starting point being time $t_{A2}$ and the duration being the width of a rectangle 65. The data transmitting/receiving unit 31 of the integrated ECU 3 then receives this data A2 in the time period indicated by the position and width of a rectangle 66, and appends and stores data A2 in the buffer(A) 392.

Assume that the CPU 35 of the integrated ECU 3 then starts to run the simultaneity ensuring program 391 at time $T_{now1}$ shown on the horizontal axis 53. In this case, data A2 is read out from the buffer(A) 392 and data B1 is read out from the buffer(B) 393, at step 315 in FIG. 4.

At step 325, the absolute value of the difference between the transmission time (calculation time: the time at which the data is calculated) data provided to data A2 and data B1, $|t_{B1}-t_{A2}|$, is compared with the predetermined amount $\epsilon$.

If $|t_{B1}-t_{A2}|<\epsilon$, it is determined whether or not data A2 and data B 1 which each have expired at step 335 and step 340, respectively. In the example in FIG. 6, the data A2 has the valid period of $L_{A2}$ indicated by an arrow 72, the data B1 has the valid period of $L_{B1}$ indicated by an arrow 74, and current time $T_{now1}$ is before the transmission time provided to data A2 and data B1 plus each valid period. At step 345, therefore, these data A2 and data B1 are stored in the use-permitted area in the RAM 37 to permit the use of the data to the engine control parameter calculation program 381 and brake control parameter calculation program 382.

If it is determined that $|t_{B1}-t_{A2}|\geq\epsilon$, at step 325, the transmission time of data A2 is after the transmission time of data B1 (see step 330). Data A1 is then read out from the buffer (A) 392 at step 365 to be replaced instead of the data A2. The determinations at steps 325, 335, and 340 are then performed for A1 replaced and B2 non-replaced. If $|t_{B1}-t_{A2}|<\epsilon$, the data A1 and data B1 have not expired because the data A1 has the valid period of $L_{A1}$ indicated by an arrow 71 as shown in FIG. 6. At step 345, therefore, the use of these data A1 and data B1 is permitted to the engine control parameter calculation program 381 and brake control parameter calculation program 382.

The ABS ECU 1 then transmits time-dependent data A3 with the starting point being time $t_{A3}$ and the duration being the width of the rectangle 67. The data transmitting/receiving unit 31 of the integrated ECU 3 then receives this data A3 in the time period indicated by the position and width of the rectangle 68, and stores data A3 in the buffer(A) 392.

Assume that the CPU 35 of the integrated ECU 3 then starts to run the simultaneity ensuring program 391 at time $T_{now2}$ shown on the horizontal axis 53. If data B1 has been deleted from the buffer(B) 393 by the engine control parameter calculation program 381 at step 315 performed at time $T_{now1}$, the buffer(B) 393 is determined to have no data by the engine control parameter calculation program 381 at step 310 performed this time, and an error is stored in the flash memory 34 at step 320, and then the simultaneity ensuring program 391 ends.

If the data B1 remains in the buffer(B) 393, the data B1 and A3 are read out at step 315, and compared on simultaneity, expiration, and the like at step 325 and subsequent steps.

Based on the comparison results, the processing is performed, which includes provision of the simultaneity to the data and record of the error information.

The engine ECU 2 then transmits the time-dependent data B2 with the starting point being time $t_{B2}$ and the duration being the width of the rectangle 69. The data transmitting/receiving unit 31 of the integrated ECU 3 then receives this data 82 in the time period indicated by the position and width of the rectangle 70, and stores data B2 in the buffer(B) 393.

Assume that the CPU 35 of the integrated ECU 3 then starts to run the simultaneity ensuring program 391 at time $T_{now3}$ shown on the horizontal axis 53. If the data A3 remains in the buffer(A) 392, the data A3 is read out from the buffer(A) 392 and the data B2 is read out from the buffer(B) 393 at step 315 in FIG. 4.

At step 325, the absolute value of a difference between the transmission time (i.e., calculation time) data provided to data A3 and data B2, $|t_{B2}-t_{A3}|$, is compared with the predetermined amount $\epsilon$.

If the termination reveals that $|t_{B2}-t_{A3}|<\epsilon$, it is then determined whether or not the data A3 and data B2 each have expired at step 335 and step 340, respectively. In the example shown in FIG. 6, the data A3 has the valid period of $L_{A3}$ indicated by the arrow 73, the data B2 has the valid period of $L_{B2}$ indicated by the arrow 75, and current time $T_{now3}$ is before the transmission time provided to the data A3 and data B2 plus each valid period. At step 345, therefore, these data A3 and data B2 are stored in the use-permitted area in the RAM 37 to permit the use of the data to the engine control parameter calculation program 381 and brake control parameter calculation program 382.

In contrast, if it is determined that $|t_{B2}-t_{A3}|\geq\epsilon$ at step 325, the transmission time of the data B2 is after the transmission time of the data A3 (see step 330), and it is determined at step 350 whether or not any data remains in the buffer(B) 393. If no data remains, information showing an error is stored in the flash memory 34 at step 370, and then the simultaneity ensuring program 391 ends.

The operation of the vehicle control system 100 as described above provides a vehicle control system comprising: the ABS ECU 1 and engine ECU 2 for transmitting time-dependent data for vehicle behavior control; and the integrated ECU 3 for receiving time-dependent data transmitted from transmitting devices in these ECUs and using the received time-dependent data to perform the processing for vehicle behavior control in real time, wherein the integrated ECU 3 compares time data (which indicate calculation and transmission time of data) included in time-dependent data which are transmitted by the ABS ECU 1 and engine ECU 2 to the integrated ECU 3, and permits, if the difference between these times are equal to or less than a predetermined amount, the use of the time-dependent data to calculate the engine control parameters and brake control parameters.

Thus, in the vehicle control system 100 for vehicle behavior control based on a plurality of received time-dependent data, the CPU 35 in the integrated ECU 3 runs the simultaneity ensuring program 391 to permit the processing for ensuring simultaneity of the received time-dependent data, in which the processing if the absolute value of a difference between the transmission time of each time-dependent data is equal to or less than a predetermined amount E, the relevant time-dependent data is used for the vehicle behavior control. Thus, the integrated ECU 3 controls vehicle behaviors using the time-dependent data permitted by simultaneity ensuring means, so that the simultaneity can be ensured between a plurality of sets of time-dependent data on which the relevant process for vehicle behavior control is based.

The ABS ECU 1 and ENGINE ECU 2 repeatedly transmit time-dependent data for vehicle behavior control. Data transmitting/receiving unit 31 in integrated ECU 3 repeatedly receives these time-dependent data. The CPU 35 performs comparison at step 325 through the simultaneity ensuring program 391, as a result of which if the difference between transmission times is more than a predetermined amount, the CPU 35 replaces one of the time-dependent data from the ABS ECU 1 and time-dependent data from the engine ECU 2 with time-dependent data received by the data transmitting/receiving unit 31, to compare the time-dependent data replaced and the other time-dependent data, and if the difference between these reference times before transmission is equal to or less than a predetermined amount, the CPU 35 uses the relevant time-dependent data replaced and the relevant other time-dependent data to perform the processing for vehicle behavior control.

Thus, even if the difference between transmission times of the time-dependent data from the ABS ECU 1 and time-dependent data from the engine ECU 2 is equal to or more than the predetermined amount $\epsilon$, one of the data can be replaced with another data that has previously been received by the data transmitting/receiving unit 31 to compare again the transmission times. Thus, the latest data that realizes the simultaneity can be used to perform the processing for vehicle control. The ABS ECU 1 and engine ECU 2 may repeatedly transmit time-dependent data that are not always received by the integrated ECU 3 in the same order as they are transmitted. If, therefore, the old time-dependent data is received after the new time-dependent data to cause the difference between the reference times before transmission compared to be equal to or more than a predetermined amount, the new time-dependent data can be replaced with another data that has previously been received, thereby providing the simultaneity.

Even if the difference between transmission times of time-dependent data compared is less than the predetermined amount $\epsilon$, it can be determined whether or not these time-dependent data have expired based on the current time, valid period, and transmission time. Only if the time-dependent data have not expired, the use of these data is permitted for the vehicle behavior control. It thus becomes less likely that too old data may be used for real-time control.

Because this embodiment performs processing based on the simultaneity of time-dependent data, measurements are preferably synchronous in the ABS ECU 1, engine ECU 2, and integrated ECU 3 in the vehicle control system 100. For this purpose, the CPU 15, CPU 25, and CPU 35 may transmit and receive time information to each other through the in-vehicle LAN 50 to run a program for a synchronizing process.

In this embodiment, the time provided to the time-dependent data from the ABS ECU 1 and engine ECU 2 equals the transmission time at which each of the relevant data is transmitted from the ABS ECU 1 and engine ECU 2, respectively (in this embodiment, the transmission time equals the time at which the relevant data is determined), but this may not be so. For example, if these time-dependent data are based on detected data from in-vehicle sensors, the time provided to these time-dependent data may be the time at which the detected data are generated or the time at which the ABS ECU 1 or engine ECU 2 receives the detected data.

In this embodiment, the data An and Bn with the simultaneity can be used in the next processing, but this may not be so. For example, when the simultaneity is provided, a set of An and Bn data are successfully processed, so that they may be treated differently from the next data and may be deleted (to cause shift by the address deleted).

In this embodiment, data without the simultaneity are not used in the process for vehicle behavior control, but this may not be so. For example, if the data have no simultaneity, with regard to the older data with older transmission time, the time dependence of the relevant older data is estimated based on that data which has previously been received, and the estimated time dependence is used to calculate the estimated value of the relevant older data at the time which the newer data is transmitted, and the calculated value and the relevant newer data are used to perform a process for vehicle behavior control.

In this embodiment, the ABS ECU 1 and engine ECU 2 transmit the time-dependent data, but sensors for transmitting data for vehicle control may transmit the time-dependent data, rather than the ECUs. In this case, the sensors may not output the time-dependent data through the in-vehicle LAN 50, but may output the data directly to the integrated ECU 3.

If the vehicle control system 100 has a plurality of real-time control apparatuses as described above, the predetermined amount $\epsilon$ serving as a threshold may be different for each real-time control. In this case, the predetermined amount $\epsilon$ may be based on details of each real-time control apparatus.

Moreover, the foregoing embodiment has been described about the two units, that is, the ABS ECU 1 and engine ECU2, functionally including the transmission devices or the control units according to the present invention. However the number of units under the control of the integrated ECU 3, that is, the reception/processing unit according to the present invention is not limited to two. Alternatively, three or more units can be placed under the integrated ECU to be subjected to the processing to ensure the simultaneity among those three or more units in the similar manner to the foregoing.

The present invention may be embodied in several other forms without departing from the spirit thereof. The present embodiments as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A system for controlling behaviors of a vehicle, comprising:
   a first transmission device that transmits a first time-dependent data to be used for controlling the behaviors of the vehicle and to be produced to attach data to the first time-dependent data, the attached data to the first time-dependent data showing a first reference time at or before which the first time-dependent data is transmitted;
   a second transmission device that transmits a second time-dependent data to be used for controlling the behaviors of the vehicle and to be produced to attach data to the second time-dependent data, the attached data to the second time-dependent data showing a second reference time at or before which the second time-dependent data is transmitted;
   a reception device that receives both of the first and second time-dependent data transmitted from the first and second transmission devices;
   a comparison member that makes a comparison between the first and second reference times shown by the data attached to the received first and second time-dependent data;
   a simultaneity ensuring member that performs processing to ensure simultaneity between the received first time-dependent data and the received second time-dependent data depending on a compared result provided by the comparison member; and a parameter producing member that produces parameters for controlling the behaviors of the vehicle, by using both of the first time-dependent data and the second time-dependent data which have been subjected to the processing performed by the simultaneity ensuring member.

2. The system according to claim 1, wherein
the first reference time is a time instant at which the first transmission unit transmits the first time-dependent data and
the second reference time is a time instant at which the second transmission unit transmits the second time-dependent data.

3. The system according to claim 2, wherein the comparison member includes
determining means determining whether or not a difference between the first and second reference times is less than a predetermined period of times, and
the simultaneity ensuring member includes allowing means allowing the processing to ensure the simultaneity to be performed, when it is determined that the difference is less than the predetermined period of time.

4. The system according to claim 2, wherein
the first transmission device is configured to repeatedly transmit the first time-dependent data,
the second transmission device is configured to repeatedly transmit the second time-dependent data
the reception device is configured to repeatedly receive both of the first and second time-dependent data,
the comparison member includes determining means for determining whether or not a difference between the first and second reference times attached to the first and second time-dependent data currently received is less than a predetermined interval of time, and
the simultaneity ensuring member includes processing means for performing processing which compensates the simultaneity obtained when the determination member determines that the difference is equal to or longer than the predetermined interval of time.

5. The system according to claim 4, wherein the processing means includes
replacing means for replacing, every type of data, either the first or second time-dependent data with an old first or second time-dependent data received last time,
determining means for determining whether or not a difference between a reference time attached to replaced time-dependent data of the first and second time-dependent data, which is subjected to the replacement, and a reference time attached to non-replaced time-dependent data of the first and second time-dependent data, which is not subjected to the replacement is less than a predetermined interval of time, and
performing means for performing the processing to ensure the simultaneity using the replaced time-dependent data and the non-replaced time-dependent data, in cases where the determining means determines that the difference is less than the predetermined interval of time.

6. The system according to claim 3, wherein the predetermined interval of time is set based on how the behaviors of the vehicle are controlled based on the first and second time-dependent data.

7. The system according to claim 3, wherein the comparison member further includes determining means for determining whether at least one of the first and second time-dependent data expires or is valid, and
the allowing means is configured to allow the processing to ensure the simultaneity to be performed, when it is determined that the difference is less than the predetermined period of time and it is determined any of the first and second time-dependent data is valid.

8. The system according to claim 1, wherein
the first transmission device is configured to repeatedly transmit the first time-dependent data,
the second transmission device is configured to repeatedly transmit the second time-dependent data
the reception device is configured to repeatedly receive both of the first and second time-dependent data,
the comparison member includes determining means for determining whether or not a difference between the first and second reference times attached to the first and second time-dependent data currently received is less than a predetermined interval of time, and
the simultaneity ensuring means includes processing means for performing processing which compensates the simultaneity obtained when the determination member determines that the difference is equal to or longer than the predetermined interval of time.

9. The system according to claim 8, wherein the processing means includes
replacing means for replacing, every type of data, either the first or second time-dependent data with an old first or second time-dependent data received last time,
determining means for determining whether or not a difference between a reference time attached to replaced time-dependent data of the first and second time-dependent data, which is subjected to the replacement, and a reference time attached to non-replaced time-dependent data of the first and second time-dependent data, which is not subjected to the replacement is less than a predetermined interval of time, and
performing means for performing the processing to ensure the simultaneity using the replaced time-dependent data and the non-replaced time-dependent data, in cases where the determining means determines that the difference is less than the predetermined interval of time.

10. The system according to claim 8, wherein the predetermined interval of time is set based on how the behaviors of the vehicle are controlled based on the first and second time-dependent data.

11. The system according to claim 8, wherein the comparison member further includes determining means for determining whether at least one of the first and second time-dependent data expires or is valid, and
the allowing means is configured to allow the processing to ensure the simultaneity to be performed, when it is determined that the difference is less than the predetermined period of time and it is determined any of the first and second time-dependent data is valid.

12. The system according to claim 1, wherein
the comparison member is configured to determine whether or not a difference between the first and second reference times is less than a predetermined interval of time, and
the parameter producing means includes exclusion means for excluding both the first and second time-dependent data from producing the parameters for controlling the behaviors of the vehicle, in cases where it is determined that the difference is less than the predetermined interval of time.

13. The system according to claim 1, wherein the comparison member includes
    determining means determining whether or not a difference between the first and second reference times is less than a predetermined period of time, and
    the simultaneity ensuring member includes allowing means allowing the processing to ensure the simultaneity to be performed, when it is determined that the difference is less than the predetermined period of time.

14. The system according to claim 13, wherein the predetermined interval of time is set based on how the behaviors of the vehicle are controlled based on the first and second time-dependent data.

15. The system according to claim 13, wherein the comparison member further includes determining means for determining whether at least one of the first and second time-dependent data expires or is valid, and
    the allowing means is configured to allow the processing to ensure the simultaneity to be performed, when it is determined that the difference is less than the predetermined period of time and it is determined any of the first and second time-dependent data is valid.

16. A system for controlling behaviors of a vehicle, comprising:
    a first transmission device that transmits a first time-dependent data to be used for controlling the behaviors of the vehicle;
    a second transmission device that transmits a second time-dependent data to be used for controlling the behaviors of the vehicle;
    a reception device that receives both of the first and second time-dependent data transmitted from the first and second transmission devices;
    a simultaneity ensuring member that performs processing to ensure simultaneity between the received first time-dependent data and the received second time-dependent data; and
    a parameter producing member that produces parameters for controlling the behaviors of the vehicle, by using both of the first time-dependent data and the second time-dependent data which have been subjected to the processing performed by the simultaneity ensuring member;
    wherein the reception device, the comparison member, the simultaneity ensuring member, and the parameter producing member are included in a unit equipped with a computer having a memory and executing a program stored in the memory,
    wherein the program includes a first-layer program in which a first type of processing for controlling the behaviors of the vehicle is described, the first type of processing dependent on a hardware configuration of the unit and a second-layer program in which a second type of processing for controlling the behaviors of the vehicle is descried, the second type of processing independent of the hardware configuration of the unit and being executed by using a result resulting from executing the first-layer program,
    wherein the first type of processing is described to functionally provides the first processing device when the computer executes the first type of processing.

17. A system for controlling behaviors of a vehicle, comprising:
    a first control unit controlling behaviors of the vehicle based on a first control parameter produced from first time-dependent data detected, wherein the first control unit includes a first transmission member transmitting the first time-dependent data to a line to which the first control unit is communicably connected, data being attached to the first time-dependent data, the attached data to the first time-dependent data showing a first reference time at or before which the first time-dependent data is transmitted;
    a second control unit controlling behaviors of the vehicle based on a second control parameter produced from second time-dependent data, wherein the second control unit includes a second transmission member transmitting the second time-dependent data to the line to which the second control unit is communicably connected, data being attached to the second time- dependent data, the attached data to the second time-dependent data showing a second reference time at or before which the second time-dependent data is transmitted; and
    a processing unit comprising
        reception means receiving through the line both of the first time-dependent data and the second time-dependent data,
        comparison means for making a comparison between the first and second reference times shown by the data attached to the received first and second time- dependent data,
        simultaneity ensuring means for performing processing to ensure simultaneity between the received first time-dependent data and the received second time-dependent data depending on a compared result provided by the comparison means,
        parameter producing means for producing the first and second control parameters by using the first and second time-dependent data which have been subjected to the simultaneity ensuring processing, and
        retuning means for returning the first and second control parameters to the first and second control unit through the line, respectively.

18. A method for controlling behaviors of a vehicle, comprising steps of:
    receiving both of first time-dependent data and second time-dependent data, data being attached respectively to the first and second time-dependent data, the attached data to the first time-dependent data showing a first reference time at or before which the first time-dependent data is transmitted, the attached data to the second time-dependent data showing a second reference time at or before which the second time-dependent data is transmitted,
    making a comparison between the first and second reference times shown by the data attached to the received first and second time-dependent data,
    performing processing to ensure simultaneity between the received first time-dependent data and the received second time-dependent data depending on a compared result provided by the comparison step, and
    producing parameters for controlling the behaviors of the vehicle using the first time-dependent data which have been subjected to the simultaneity-ensuring processing performed.

* * * * *